Dec. 23, 1924.

D. H. BELLAMORE 1,520,104

DISK WHEEL AND METHOD OF MAKING THE SAME

Filed March 30, 1921   2 Sheets-Sheet 1

INVENTOR
David H. Bellamore
BY Jas. H. Griffin
ATTORNEY

Dec. 23, 1924.  1,520,104
D. H. BELLAMORE
DISK WHEEL AND METHOD OF MAKING THE SAME
Filed March 30, 1921  2 Sheets-Sheet 2
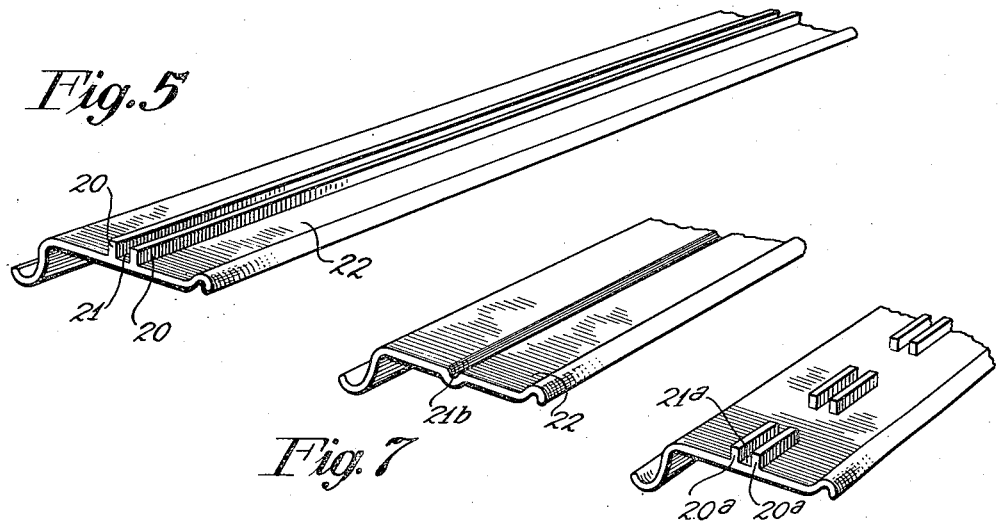
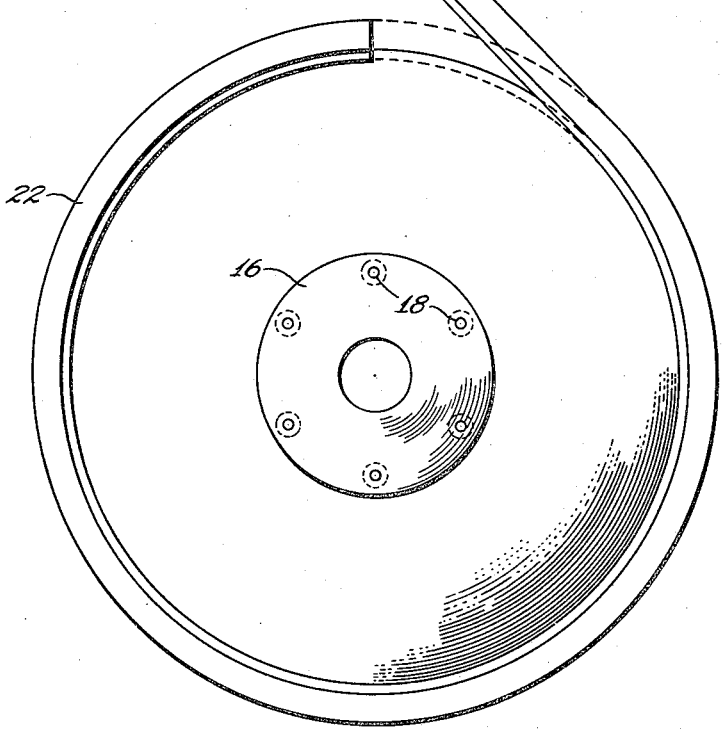
INVENTOR
David H. Bellamore
BY Jas. H. Griffin
ATTORNEY Patented Dec. 23, 1924.

1,520,104

UNITED STATES PATENT OFFICE.

DAVID H. BELLAMORE, OF NEW YORK, N. Y.

DISK WHEEL AND METHOD OF MAKING THE SAME.

Application filed March 30, 1921. Serial No. 456,849.

*To all whom it may concern:*

Be it known that I, DAVID H. BELLAMORE, a citizen of the United States, residing at New York city, borough of Manhattan, in the county and State of New York, have invented a certain new and useful Disk Wheel and Method of Making the Same, of which the following is a specification.

This invention is a disk wheel for motor vehicles as well as the method of making the same, and contemplates the efficient and economical manufacture of wheels of this character.

Disk wheels as usually constructed embody a hub, a rim, and one or more disks for spacing the hub from the rim and it has been the common practice to screw the disks to one another and to the rim by means of bolts, rivets or welding, while the disk portion of the wheel is mounted on the hub either by rivets or by the usual hub bolts. Wherever the manufacture of a wheel requires the welding, bolting or riveting of the parts together, such operations require the employment of highly skilled hands and the expenditure of considerable time in the fabrication of the wheel. Accordingly, wheels so constructed, and up to the present time, practically all disk wheels have been so made, are expensive and more or less heavy. It is the object of this invention to incidentally minimize the weight of the wheel and primarily to expedite, facilitate and simplify its manufacture through the practicing of the novel method and procedure hereinafter described.

The salient feature of this invention, and one which marks a pronounced departure from prior practice, resides in the method of securing the rim of the wheel to the disk portion thereof. Heretofore the disk or disks of the wheel have invariably been secured to the rim by bolts, rivets or welding, whereas the present invention provides for the mounting of the rim on the disk portion thereof to the exclusion of the employment of any of these well known expedients.

In practically carrying out this feature of the invention, the operation of joining the ends of the rim is availed of to simultaneously mount the rim upon the disk portion of the wheel. In this manner, a large number of steps or operations hereinbefore considered indispensible are entirely eliminated.

Another feature of the invention resides in the manner in which the central part of the disk portion of the wheel may be reinforced by a member in addition to the disk or disks which member is secured in place without the employment of extraneous means and also serves as a means for securing the central portions of the disks, when more than 1 is used, together.

When the present invention is practiced, in wheel construction, a wheel may be entirely assembled and ready to be placed upon a hub without employing any extraneous attaching means, such as bolts or rivets, or welding the parts together, other than the well known welding operation required to secure together the ends of the rim section of the wheel. In this respect, the present invention is a pronounced departure from the prior art, wherein, so far as applicant is aware, there is not a single wheel capable of manufacture without the employment of such expedients.

Features of the invention, other than those specified, will be apparent from the hereinafter detailed description and claims, when read in conjunction with the accompanying drawings.

The accompanying drawings illustrate several ways in which the method of the present invention may be produced, as well as different forms of construction which may enter into the practical carrying out of a wheel made in accordance with the method of this invention. I wish it understood, however, that different forms of wheels, i. e., wheels embodying different structural characteristics may be produced by the method of this invention and that the structural details of the wheel may be changed without departing from the invention. The showing made in the drawings is, for illustrative purposes only, and does not define the limits of the invention.

Figure 1 is a fragmental radial section perspective of a wheel made in accordance with the method of this invention.

Figures 2, 3, and 4 are radial sections of the wheel shown in Figure 1, showing different steps in the process of manufacture.

Figures 5, 6 and 7 show illustrative forms of rim sections which may be employed.

Figure 8 is a face view of a wheel in the process of manufacture; and,

Figure 1:
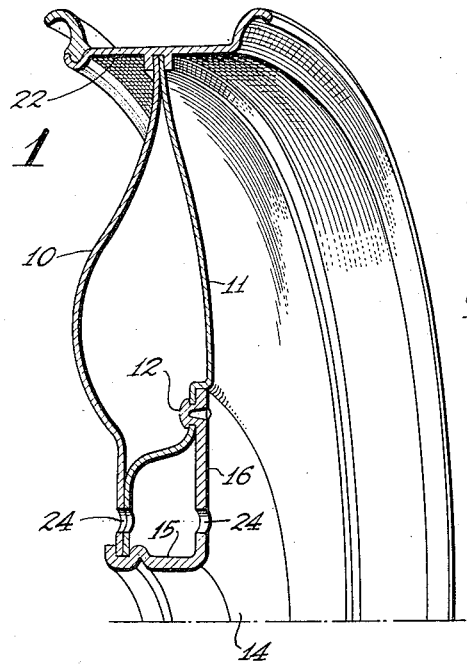

The method of the present invention may be practised in the manufacture of disk wheels embodying either one or a plurality of disks, but for the purpose of graphic illustration, the making of a wheel embodying two disks will be specifically described. The process, as employed in the making of a wheel of this character is as shown in Figures 1 to 8, inclusive, and is carried out as follows:

Two disks 10 and 11 are stamped, pressed or otherwise cut and formed into the desired shapes and both disks are made of the same diameter. Both disks are stamped out at their centers to provide hub openings and between the inner and outer peripheries of the disk 11 is formed an annular series of holes 12.

A filler member 14 is shown as entering into the construction illustrated and this filler member 14 embodies a sleeve-like portion 15 provided at one end with a radially extending flange 16. The filler 14 is suitably manipulated in the making to provide an annular bead 17 on its sleeve portion and an annular series of laterally extending hollow bosses 18 on the inner face of its flange portion. In practice, the filler may be conveniently stamped or pressed up from malleable metal.

Figure 2:
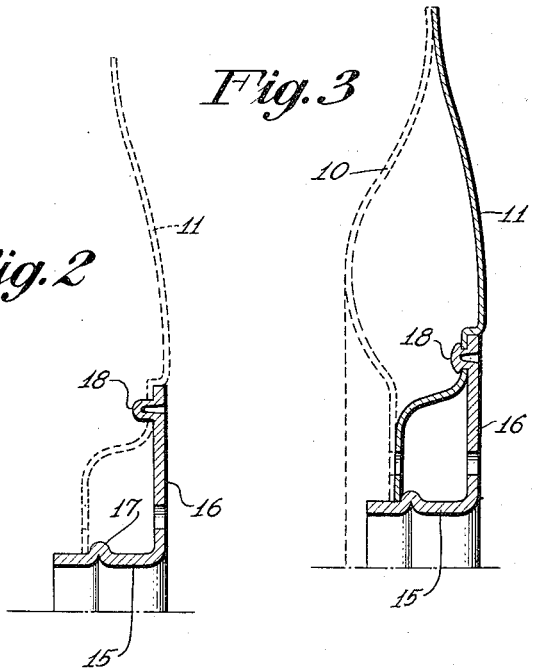
Figure 3:
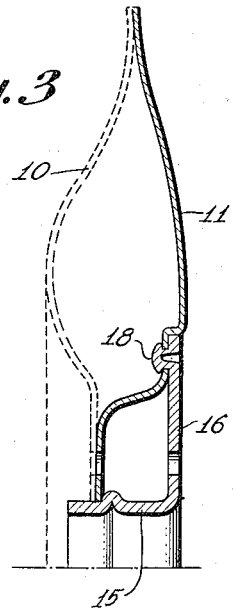
Figure 4:
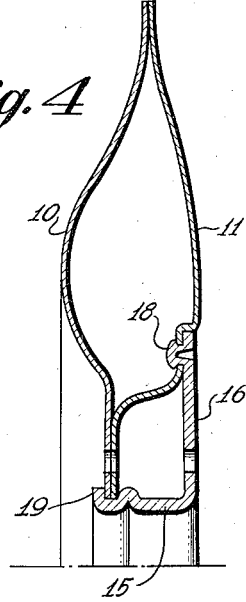

In assembling the parts, thus far described, the inner disk 11 is slipped over the filler into the position shown in dotted lines in Figure 2, so that the inner periphery of the disk will seat against the bead 17, while the hollow bosses or projections 18 will extend through the perforations 12 of the disk. After the disk has been brought into this position with relation to the filler, the ends of the bosses 18 are subjected to pressure or otherwise compressed and expanded as shown in the Figure 3, whereby the disk 11 is firmly secured to the flange 16 of the filler. The other disk 10 is now slipped over the sleeve portion of the filler so that its central and marginal portions come into abutting relation with the central and marginal portions of the disk 11, as shown in dotted lines in Figure 3, whereupon the free end of the sleeve portion 15 is flared or flanged outwardly as shown at 19 in Figure 4, for the purpose of tightening the inner peripheries of the two disks 10 and 11 firmly together between the bead 17 and the flange 19. The resulting structure will be as shown in Figure 4.

With a wheel thus far constructed, I may associate any suitable form of rim and may secure the rim in position in any desired way either by flanging the outer ends of the disks or otherwise, but in the preferred manner of practicing the invention, the procedure next to be described is followed.

The rim is made in the form of a continuous strip of suitable cross sectional shape, three of which shapes are shown in Figures 5, 6 and 7. In the construction of Figure 5, the inner face of the rim is provided with two parallel ribs 20 forming an intermediate channel 21. In the construction of Figure 6, substantially the same construction is followed except that spaced lugs 20ª are provided intermediate the broken channel 21ª. In the construction of Figure 7, however, the rim is rolled with a central channel 21ᵇ. All of these rim sections may be applied to the wheel thus far constructed in the same way, but in Figure 8 of the drawings, I have shown the rim section of Figure 5 in the course of application. To apply the rim section of Figure 5, the strip of rim section is manipulated by any suitable means from the form of the flat strip shown into a annular band, which is passed or sprung about the assembled disks in such manner that the outer peripheries of the disks will occupy the channel 21 in the rim section, as clearly shown in Figure 8. This having been accomplished, the opposite ends of the rim are brought into abutting relation and are welded together. This welding operation not only serves to secure the ends of the rim together with the resulting rim 22 in a position to tightly embrace the disks 10 and 11, but also serves to secure the disks to the rim at the point of the weld, thereby precluding slipping of the rim circumferentially of the disk portion of the wheel.

The foregoing description has dealt with a wheel embodying two disks, and I have described the manner in which a rim may be applied to such a two disk wheel. However, it will be manifest that a single disk wheel may be similarly associated with the rim by simply taking the disk portion of the wheel as shown in Figure 3 and applying the rim thereto in the manner described.

It is to be further understood that the method of applying a rim to one or more disks might well be practiced on wheels having a central construction other than that shown in the drawings. That is to say, the central portion of the disk or disks might be formed in any way and the method of attaching the rim thereto nevertheless be carried out irrespective of the central portion of the wheel formation.

Figure 9:
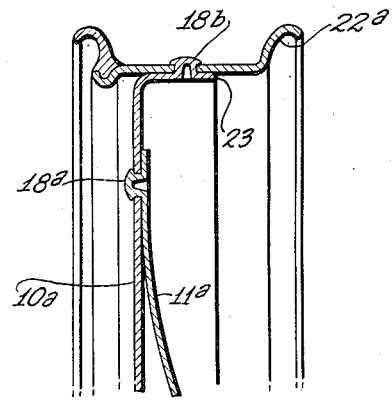
Figure 9 is a radial section illustrating a modified form of wheel section, which the present invention also contemplates.

In Figure 9 of the drawings, a modified form of construction is shown. In this construction, a wheel is illustrated having a main disk 10ª and a reinforcing disk 11ª, the latter of which extends from the hub only part way to the rim. The outer margin of the reinforcing disk 11ª is flanged over to provide a flange 23 which is formed with bosses 18ᵇ adapted to pass through apertures in the rim 22ª and to be expanded or flattened out, so as to secure the flange 23 firmly to the rim. In practice, the bosses 18ᵇ may be formed on the rim and passed through apertures in the flange 23. I am further aware that a wheel constructed with a main and reinforcing disk as shown in Figure 9 may be secured to the rim after the manner shown in Figure 8, by omitting the flange 23, and I further appreciate that in the construction shown in Figure 9, the reinforcing disk 11ª may, if desired, be dispensed with.

It will be apparent from the foregoing description, that the wheel of this invention may be constructed entirely of the material of its several parts and without the employment of any extraneous fastening means or expedients, such as separate bolts or rivets. Of course, it will be understood that the filler, as well as both the disks 10 and 11 are provided with alined apertures 24, through which the hub bolts may be passed to secure the wheel on the hub, but this arrangement is highly desirable since it permits of ready attachment or detachment of the wheel with respect to the hub and forms no part of disk wheel construction in the present invention.

Having thus fully described the invention, what I claim as new and desire to secure by Letters Patent is:

1. The method of making disk wheels which consists in constructing the rim of the wheel in the form of a split ring, thereafter bringing the split ring in a position to embrace the disk or disks of the wheel with the ring and the disk in interlocked relation, and thereafter securing the ends of the split ring together.

2. The method of making disk wheels which consists in constructing the rim of the wheel in the form of a split ring having its inner periphery formed to interlock with the outer periphery of the disk of the wheel and then bringing the ends of the rim together and securing them in abutting relation to maintain the rim interlocked with the disk.

3. The method of making disk wheels which consists in constructing the rim of the wheel in the form of a split ring having its inner periphery formed to interlock with the outer periphery of the disk of the wheel and then bringing the ends of the rim together and welding them to one another and to the disk at this point to maintain the rim in end abutting relation with the rim interlocked with the disk and welded thereto.

4. The method of making disk wheels which consists in forming a strip of material having a cross sectional rim shape and a disk engaging channel extending longitudinally of the strip, then bending the strip longitudinally into the form of an open ring, then bringing the open ring in a position to embrace the disk or disks of the wheel with the outer periphery of said disk or disks in positions within the channel of the open ring, and thereafter uniting the ends of the ring.

5. The method of making disk wheels which consists in forming a strip of material having a cross sectional rim shape and a disk engaging channel extending longitudinally of the strip, then bending the strip longitudinally into the form of an open ring, then bringing the open ring in a position to embrace the disk or disks of the wheel with the outer periphery of said disk or disks in positions within the channel of the open ring, and thereafter uniting the ends of the ring by welding which serves to secure the ends of the ring in face abutting relation and also secures the disk or disks to the ring to preclude circumferential movement of the rim on the disks.

6. A disk wheel embodying a pair of opposed disks having their outer marginal portion in face abutting relation and other portions in spaced relation, and a permanent rim member embracing the disks and formed on its inner periphery to interlock with the face abutting marginal portions and both of said disks, to lock the disks to the rim without the employment of extraneous attaching means.

7. A disk wheel embodying a pair of opposed disks having their outer marginal portions in face abutting relation, a permanent rim member embracing the disks and provided on its inner periphery with means carried wholly by the permanent rim member and interlocking with the face abutting marginal portions of said disks for the purpose of locking the disks to the rim member without the employment of extraneous attaching means.

8. A disk wheel embodying a plurality of disks provided with central hub openings and which disks are in face abutting relation adjacent the hub openings thereof, a rim embracing the outer peripheries of the disks, filler means associated with the disks adjacent their hub openings for imparting the desired thickness to the wheel at its center and means integral with cooperating parts of the wheel construction for securing the disks to the rim and the filler means to the disks without the employment of extraneous securing means.

9. A disk wheel embodying a disk provided with a hub opening, a cylindrical member extending through the hub opening of the disk and provided with a radial flange secured adjacent its outer periphery to the disk, the cylindrical member being also secured to the disk to preclude longitudinal movement of the cylindrical member in the hub opening of the disk.

10. A disk wheel embodying at least one disk provided with a hub opening, a cylindrical member extending through the hub opening of the disk and provided at one end with a radially projecting flange, bosses formed on the flange and extending through and beyond apertures in the disk, said bosses being expanded beyond the disk to lock the disk firmly to the flange, and means for securing the cylindrical member against longitudinal movement in the hub opening of the disk.

11. A disk wheel embodying at least one disk provided with a hub opening, a cylindrical member extending through the hub opening of the disk and provided at one end with a radially projecting flange, bosses formed on the flange and extending through and beyond apertures in the disk, said bosses being extended beyond the disk to lock the disk firmly to the flange, and an annular channel formed on the cylindrical member and in which the disk seats.

12. A disk wheel embodying at least one disk provided with a hub opening, a cylindrical member extending through the hub opening of the disk and provided at one end with a radially projecting flange, bosses formed on the flange and extending through and beyond apertures in the disk, said bosses being extended beyond the disk to lock the disk firmly to the flange, an annular bead formed on the cylindrical member and against which the disk is adapted to seat, and the free end of the sleeve being flared outwardly to tightly clamp the disk against the bead.

13. A disk wheel embodying a pair of disks provided with hub openings and in face abutting relation adjacent the hub openings, a substantially cylindrical member extending through the hub openings of both disks and adapted to clamp the inner margins of both disks firmly together, said cylindrical member being provided with a radially extending flange secured to one of the disks intermediate the hub opening and the outer periphery of such disks.

14. A disk wheel embodying a pair of disks provided with hub openings and in face abutting relation adjacent the hub openings, a substantially cylindrical member extending through the hub openings of both disks and adapted to clamp the inner margins of both disks firmly together, said cylindrical member being provided with a radially extending flange secured to one of the disks intermediate the hub opening and the outer periphery of such disk, the disk which is secured to said flange being offset to provide a shoulder adapted to seat upon the outer periphery of the flange.

15. A disk wheel embodying a pair of disks provided with hub openings and in face abutting relation adjacent the hub openings, a substantially cylindrical hub portion extending through the hub openings of both disks and clamping the inner margins of both disks together, said hub portion being provided with a radially extending flange secured to at least one of the disks intermediate the hub opening and the outer periphery of such disk, said disk being provided with a shoulder seating upon the outer periphery of said flange.

16. A disk wheel embodying a disk provided with a hub opening, a cylindrical member extending through the hub opening of the disk and provided on one end with a radially extending flange contacting with the disk intermediate the hub opening and the outer periphery of the disk, said disk being provided with an annular shoulder adapted to seat upon the outer periphery of the flange.

17. A disk wheel embodying a disk provided with a hub opening, a cylindrical member extending through the hub opening of the disk and provided on one end with a radially extending flange contacting with the disk intermediate the hub opening and the outer periphery of the disk, said disk being provided with an annular shoulder adapted to seat upon the outer periphery of the flange, and an annular bead formed on the cylindrical member and against which bead the disk is adapted to seat, that portion of the cylindrical member exteriorly of the disk being expanded for the purpose of clamping the disk firmly against the bead.

18. A disk wheel embodying a substantially cylindrical hub portion provided at one end with a substantially radially extending flange, and a disk provided with a hub opening embracing said cylindrical portion, the disk being permanently and rigidly secured to the cylindrical portion to preclude movement of the disk longitudinally of the cylindrical portion, and said disk being provided with a shoulder resting upon and bearing against the outer periphery of the flange.

In testimony whereof, I have signed my name to this specification.

DAVID H. BELLAMORE.